United States Patent
Gitis et al.

(10) Patent No.: US 6,922,313 B1
(45) Date of Patent: Jul. 26, 2005

(54) MAGNETIC HEAD SLIDER WITH RESISTANCE TO DEBRIS ACCUMULATION

(75) Inventors: Naum V. Gitis, Cupertino, CA (US); Victor Dunn, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 993 days.

(21) Appl. No.: 09/491,284

(22) Filed: Jan. 26, 2000

Related U.S. Application Data

(63) Continuation of application No. 08/161,234, filed on Dec. 2, 1993, now Pat. No. 6,084,743, which is a continuation-in-part of application No. 07/992,270, filed on Dec. 14, 1992, now abandoned.

(51) Int. Cl.[7] .................................................. G11B 5/58
(52) U.S. Cl. .................................................. 360/246.2
(58) Field of Search ........................ 360/246.1, 246.2, 360/246.5, 237.1, 235.4, 236.4, 236.5, 236.8

(56) References Cited

U.S. PATENT DOCUMENTS

| | | | |
|---|---|---|---|
| 4,644,641 A | 2/1987 | Verdone ................... | 360/235.6 |
| 4,700,248 A | 10/1987 | Coughlin et al. ........... | 360/224 |
| 4,709,284 A | 11/1987 | Endo et al. ............... | 360/235.3 |
| 4,757,402 A | 7/1988 | Mo ......................... | 360/235.4 |
| 4,803,578 A * | 2/1989 | Fujiwara et al. .......... | 360/246.1 |
| 4,819,091 A * | 4/1989 | Brezoczky et al. ....... | 360/237.1 |
| 4,870,619 A | 9/1989 | Van Ness .................... | 365/208 |
| 4,901,185 A * | 2/1990 | Kubo et al. ............... | 360/246.1 |
| 4,926,274 A | 5/1990 | Saitoh et al. ............. | 360/246.2 |
| 4,939,603 A | 7/1990 | Inumochi .................. | 360/236.4 |
| 4,961,121 A | 10/1990 | Astheimer et al. ........ | 360/236.7 |
| 5,041,932 A | 8/1991 | Hamilton .................. | 360/246.1 |
| 5,063,712 A | 11/1991 | Hamilton et al. ........... | 451/173 |
| 5,065,271 A * | 11/1991 | Matsuura et al. ......... | 360/246.2 |
| 5,111,351 A | 5/1992 | Hamilton .................. | 360/246.1 |
| 5,175,658 A | 12/1992 | Chang et al. ............. | 360/235.2 |
| 5,196,974 A | 3/1993 | Higashiya et al. .......... | 360/103 |
| 5,198,934 A | 3/1993 | Kubo et al. .............. | 360/246.2 |
| 5,488,524 A * | 1/1996 | Cunningham ............. | 360/237.1 |
| 5,541,789 A * | 7/1996 | Fukuoka et al. ......... | 360/246.1 |

FOREIGN PATENT DOCUMENTS

| | | |
|---|---|---|
| JP | 61-206917 | 9/1986 |
| JP | 1-199364 | 8/1989 |
| JP | 1-298585 | 12/1989 |
| JP | 2-101688 | 4/1990 |
| JP | 2-239420 | 9/1990 |
| JP | 2-244419 | 9/1990 |
| JP | 3-214478 | 9/1991 |
| JP | 4-76874 | 3/1992 |

* cited by examiner

*Primary Examiner*—David L. Ometz
(74) *Attorney, Agent, or Firm*—David M. Sigmond

(57) ABSTRACT

A magnetic recording head for reading and writing information with respect to a rotating disk medium includes a pad having a working surface which contacts the recording medium. The pad has a leading edge and a trailing edge with the leading edge facing in the general direction of relative motion between the head and the medium. The ledge has a narrower width than the trailing edge so as to reduce the effort of debris accumulation at the disk-head interface. The narrower leading edge allows the head to deflect oncoming debris as the head traverses the surface of the rotating magnetic medium.

1 Claim, 3 Drawing Sheets

FIG. 3A  FIG. 3B

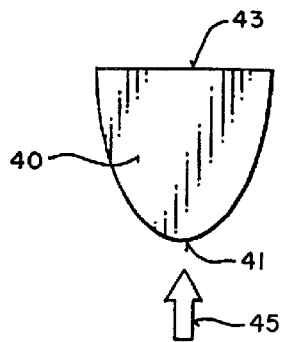
FIG_4A
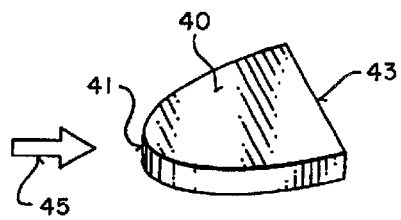
FIG_4B
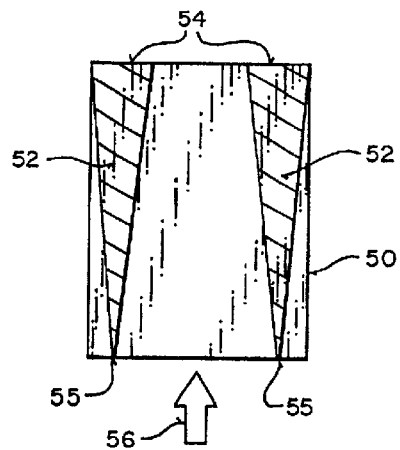
FIG_5A
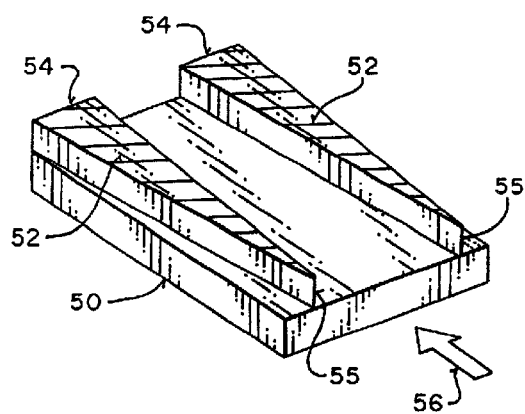
FIG_5B
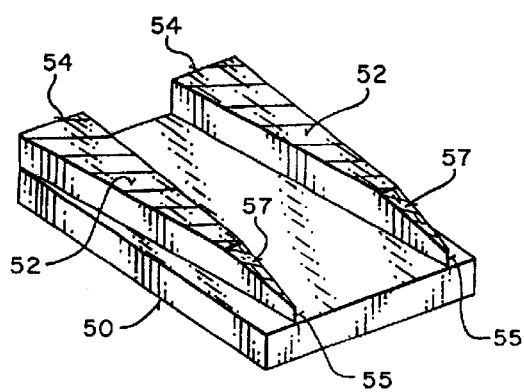
FIG_5C

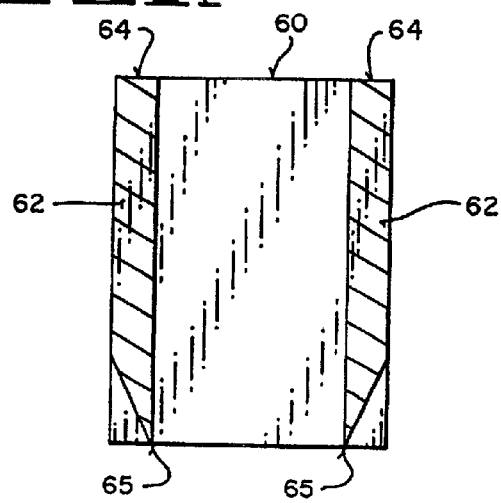
FIG_6A
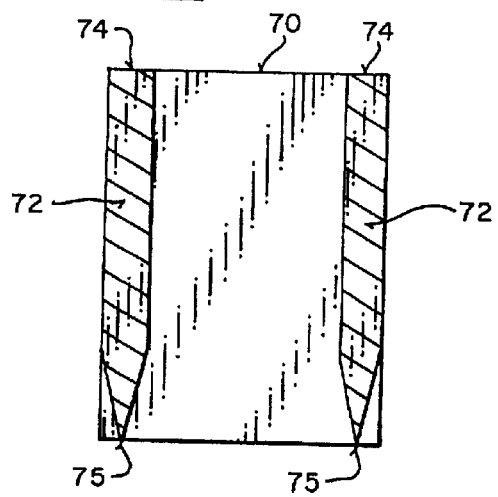
FIG_6B
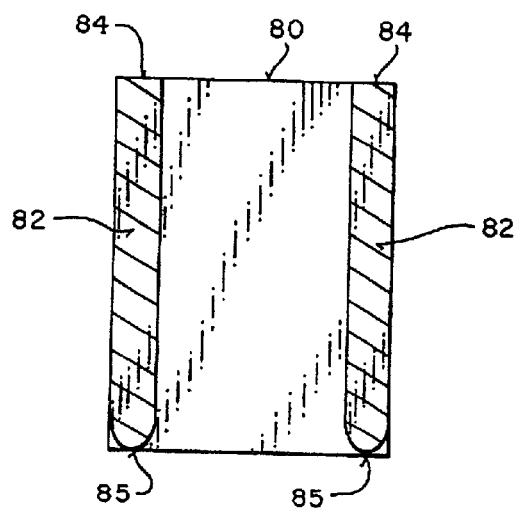
FIG_6C

MAGNETIC HEAD SLIDER WITH RESISTANCE TO DEBRIS ACCUMULATION

CROSS-REFERENCE TO RELATED APPLICATIONS

This application is a continuation of U.S. application Ser. No. 08/161,234, filed Dec. 2, 1993, now U.S. Pat. No. 6,084,743, which is a continuation-in-part of U.S. application Ser. No. 07/992,270, filed Dec. 14, 1992, now abandoned.

FIELD OF THE INVENTION

This invention relates to the fields of magnetic recording and tribology. More specifically, the invention relates to the design of magnetic recording heads and sliders for primary use in near-contact and in-contact recording systems.

BACKGROUND OF THE INVENTION

Researchers working in the magnetic recording industry have recently begun focusing their efforts on developing thin film heads having a so-called integrated head/flexure/conductor structure for reading and writing of information to a disk medium. For example, such a magnetic head structure is disclosed in U.S. Pat. No. 5,041,932. In this type of recording technology, a magnetic pole element is embedded within the body of the magnetic recording head. Advanced performance is achieved in these types of magnetic recording heads by including a contact pad region which is in non-catastrophic, continuous sliding contact with the surface of the recording medium. The contact pad includes a working surface portion which is extremely small—on the order of about 20×30 microns The working surface portion of the contact pad actually touches the disk during normal operation.

One of the problems associated with recording heads which are in contact with the recording medium is that a substantial amount of debris is generated by the sliding action of the head against the surface of the disk. As well as being a direct result of slider-disk micro-interactions, dust and dirt from both the environment and the drive can also accumulate on and around the contact pad region. Eventually, this particulate matter finds its way into the interface between the contact pad and the disk, leading to adverse effects such as signal modulation caused by particle induced fluctuations in the head-disk spacing, and increased wear resulting from debris entering the friction zone and scratching the working surfaces.

The problem with debris accumulation is also present in more conventional slider designs in which the head flies above the surface of the disk. By way of example, In a typical magnetic recording system, the rotation of the rigid disk causes the magnetic head or slider to become hydrodynamically lifted above the surface of the recording medium. This hydrodynamic lifting phenomena results from the flow of air produced by the rotating magnetic disk; it is this air flow which causes the head to "fly" above the disk surface. Of course, when the rotation of the magnetic disk slows or stops, the head element is deprived of its buoyancy and it lands on the surface of the disk. Repeated starting or stopping of the disk causes the recording head to be dragged across the surface of the disk over and over again during the "take-off" and "landing" phases of its flight.

The current trend in the industry is toward increasing the magnetic signal strength by lowering the slider flying height. In the conventional type of magnetic recording head described above, this means that the separation between the head and the disk is radically reduced. For instance, very low flying heights on the order of 1 to 3 microinches are becoming increasingly common. Obviously, reducing the separation between the head and the disk medium results in increased abrasive wear. Thus, in both the near-contact (flying low, e.g., at 1 to 3 microinches) and the in-contact types of recording systems, debris accumulation is a significant problem.

It should be understood that in the conventional type of magnetic recording head which flies above the surface of the disk (i.e., near-contact recording system), the working surface which touches the disk normally comprises two or more rails having flat bottom surfaces. For example, sliders of this type are disclosed in U.S. Pat. Nos. 4,870,619; 4,961,121; 4,926,274; and 4,709,284. To increase the hydrodynamic lifting force, many sliders have a front taper as described in U.S. Pat. No. 4,939,603. Other designs include a sloping working surface. In either case, the taper and/or slope are in the vertical direction; that is, perpendicular to the disk surface. Other prior art designs include the so-called slider camber and crown—characterized by their vertical slopes in both the longitudinal and cross directions, respectively. This latter type of design is usually selected based on considerations of smaller contact area so as to reduce the problem of stiction. The drawbacks to these designs however include the requirement for a higher take-off velocity and an, increased wear rate.

What is needed then in both the near-contact and in-contact recording technologies is a slider design which is able to reduce the effect of debris accumulation so as to improve the wear rate in magnetic recording signal strength. As will be seen, the present invention comprises a magnetic head slider suitable for use in in-contact and near-contact recording systems in which the leading edge of the working surface has a narrower width as compared to the trailing edge. In several embodiments described below, the contact pad or slider rails assume either a "V" or "U" shape in the direction of flying or sliding.

Other prior art known to Applicant includes U.S. Pat. No. 4,757,402 which discloses a slider presenting a substantially equal cross sectional area to an air film moving with the media as the head is skewed slightly relative to the oncoming air flow.

SUMMARY OF THE INVENTION

The present invention covers a magnetic recording head for reading and writing information with respect to a rotating disk medium. In one embodiment, the invented recording head includes a pad region having a working surface which contacts the recording medium during the reading/writing process. The recording head may have an integrated structure wherein a magnetic pole structure is embedded within the pad region. The pad itself has a leading edge and a trailing edge with the leading edge facing In the general direction of relative motion between the head and the medium. According to the invention, the leading edge has a narrower width than the trailing edge so as to reduce the effect of debris accumulation at the disk-head interface. A narrower leading edge allows the head to deflect oncoming debris as the head traverses the surface of the rotating magnetic medium.

In several implementations of the present invention the pad assumes a "V" or "U" shape. Shaping the pad in this manner is both advantageous to pushing the debris away from the slider as well as removing the debris away from the head by means of the hydrodynamic air flow. By reducing the amount of debris accumulated on and around the head, the present invention alleviates the prior art problems of excessive head wear and distortion of the magnetic signals.

In another embodiment, a slider for supporting a magnetic transducer comprises a body, and a plurality of rail members extending outward from the body in a direction toward the disk surface. The leading edge of each rail member faces in the direction of relative motion between the slider and the disk and has a narrower width as compared to the trailing edge. Each of the rail members includes an air-bearing surface which resides in a plane roughly parallel to the surface of the disk.

BRIEF DESCRIPTION OF THE DRAWINGS

The present invention is illustrated by way of example and not limitation in the figures of the accompanying drawings, in which like references indicate similar elements, and in which:

FIGS. 3A and 3B illustrate the contact pad region of a magnetic recording head in accordance with the present invention. FIG. 3A is a bottom view of the contact pad, whereas FIG. 3B is a perspective view.

FIGS. 4A and 4B illustrate an alternative embodiment of the present invention. FIG. 4A represents a bottom view, and FIG. 4B is a perspective view.

FIGS. 5A, 5B and 5C illustrate a slider having V-shaped rail members in accordance with yet another embodiment of the present Invention. FIG. 5A is a bottom view, and FIGS. 5B and 5C are both side perspective views.

FIGS. 6A, 6B, and 6C illustrate bottom views of still other alternative embodiments of the present invention.

DETAILED DESCRIPTION

A magnetic recording head with improved resistance to debris accumulation is described. In the following description, numerous specific details are set forth, such as material types, shapes, processing steps, etc., in order to provide a thorough understanding of the present invention. However, it will be obvious to one of ordinary skill in the art that the invention may be practiced without these specific details. In other instances, well known elements and processing techniques have not been shown In particular detail in order to avoid unnecessarily obscuring the present invention.

Figure 1:
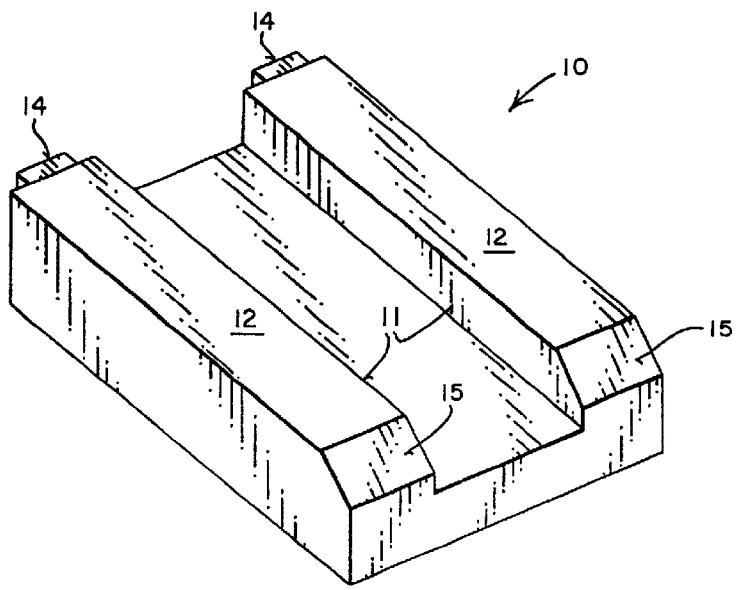
FIG. 1 is a perspective view of a prior art slider designed to fly at a predetermined height above the surface of a rotating magnetic disk.

With reference to FIG. 1, there is shown a typical slider 10 for use in a conventional magnetic recording system. Slider 10 comprises a rectangular body onto which are formed a pair of substantially parallel rails 11 disposed along opposite sides of the slider body. Each of the rails 11 includes a surface 12 which functions as the primary load-bearing surface of the slider during normal operation. It is these surfaces 12 which alternately come into contact with, and are separated from, the disk during dwelling, starting, and stopping of the drive. Surfaces 12 are often referred 10 as the "air-bearing" surfaces of the slider since the rotation of the disk generates a hydrodynamic air pressure against surfaces 12; the pressure causing slider 10 to be lifted above the surface of the magnetic medium. Note further that each slider rail 11 is shown having a magnetic transducer element 14 attached to the rear or trailing edge of the slider body. At the leading edge of each rail is a tapered portion 15 which facilitates the take-off of slider 10 from the surface of the disk during spin-up.

As explained in the previous section, the lower slider flying heights which are becoming increasingly common in magnetic recording systems have lead to more frequent interaction between the slider and disk. As a direct result, the problem of accumulation of wear debris (as well as dust and dirt from both the environment and the drive) has diminished the performance of many conventional hard disk drive systems.

Figure 2:
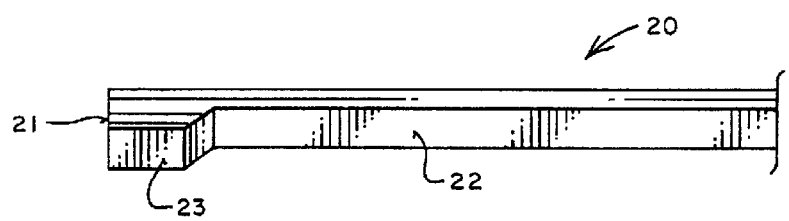
FIG. 2 is a perspective view of another type of prior art magnetic recording head.
Figure 2:
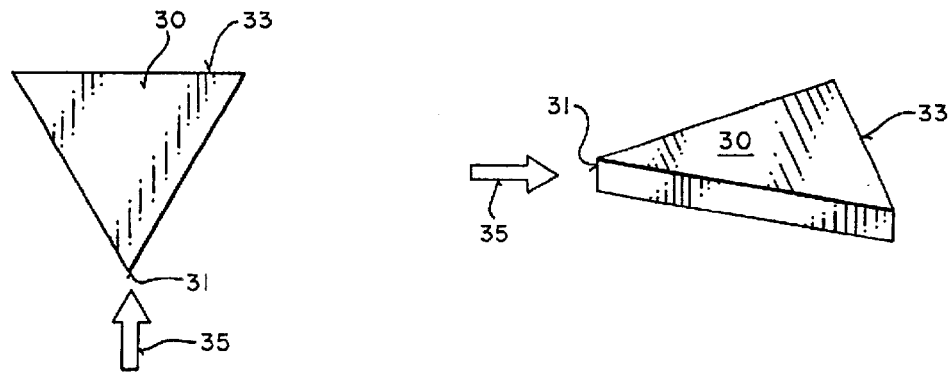

FIG. 2 illustrates another type of read/write head structure which also suffers from the problem of excessive debris accumulation at the head-disk interface. The integrated read/write head/flexure/conductor structure 20 shown in FIG. 2 comprises an elongated, dielectric flexure body 22 having a pad 21 disposed at one end. A magnetic pole element is embedded within pad 21 to provide flux-coupling to the magnetic underlayer of the recording medium. Pad 21 also includes a working surface 23 which is in substantially continuous sliding contact with the disk recording medium during read/write operations. The area of the working surface is usually made to be very small with a typical recording head of this type having a pad area of approximately 30×20 microns.

Because working surface 23 of the recording head 20 is in continuous, direct mechanical contact with the disk, accumulation of particulate matter is a significant problem. By way of example, debris accumulation often leads to undesirable magnetic signal modulation effects caused by particle-induced fluctuations in the head-disk space. An increased wear rate of the contact pad also results due to debris which enters into the friction zone between working surface 23 and the surface of the rotating disk.

The magnetic recording head of the present invention radically reduces debris accumulation at the head-disk interface by including a leading edge that has a narrower width as compared to its trailing edge. (The leading edge faces in the general direction of relative motion between the head and the recording medium.) In different embodiments the head can assume a variety of shapes: triangular (i.e., V-shaped), wedge-shaped, U-shaped, parabolic, etc. The reduction in debris accumulation achieved by the invented head makes it ideally-suited for use in nearcontact and in-contact recording systems in which the head is in frequent or continuous contact with the disk surface.

By way of illustration, FIGS. 3A and 3B show a contact pad 30 suitable for use in an integrated read/write head of the type described in connection with FIG. 2. Contact pad 30 has a "wedge" or"V-shape" in which the leading edge 31 is much narrower than the trailing edge 33. The leading edge 31 faces in the direction of flying or sliding (parallel to the disk) with the narrow or sharp part of the shape facing toward the general direction of relative motion between the head and the medium.

Although FIGS. 3A and 3B show the entire slider being shaped in an overall triangular or V-shape, it should be understood that in some cases only the front portion or leading section of the contact pad structure may be shaped in this way. In other words, the essential characteristic of the invention is that the leading edge of slider be shaped so as to push away debris as the head slides across the surface of the recording medium. Note that the relative direction of motion of the recording medium is shown in FIGS. 3A and 3B by arrow 35. Any debris present on the surface of the if recording medium is diverted away from the slider-disk interface along the sides of slider 30 in accordance with the present invention. Thus, the shape of the contact pad or slider provides a means for reducing the amount of debris being brought into the friction zone by a hydrodynamic flow.

FIGS. 4A and 4B show an alternative embodiment of the present invention in which contact pad 40 includes a leading edge 41 which has a parabolic or U-shape. Trailing edge 43 remains straight. The direction of relative motion between the contact pad and the medium is shown in FIGS. 4A and 4B by arrow 45. Once again, it is appreciated that the parabolic or U-shaped leading edge faces direction of sliding. Note also that it makes little difference whether the curved leading edge is actually "U"-shaped, parabolic, hyperbolic, or described by some other mathematical function. It should also be understood that in the embodiments of FIGS. 3A, 3B, 4A, and 4B, it may be desirable to taper the leading edges in order to improve the sliding and/or flying characteristics of the head.

With reference now to FIGS. 5A and 5B, there is shown a slider 50 for use in a magnetic recording system of the type in which the head flies at an extremely low height, i.e., less than 3 microinches over the magnetic recording disk. In this type of recording system, the slider body alternately contacts and moves away from the surface of the disk—achieving a stable flying height during reading/writing operations.

As can be seen, slider 50 differs from the conventional slider design shown in FIG. 1 in that the rail members 52 are manufactured to have a V-shape extending from the leading to the trailing edges. The V-shape reduces debris accumulation and also enhances the hydrodynamic properties of the slider. Note that the leading edge of each rail 52 is substantially narrower than the trailing edge 54. The trailing edge 54 of each rail 52 represents the portion of the slider where the transducer is normally attached. As before, the direction of air flow is the same as the general direction of relative motion between the head and the medium. The air flow is directed toward the leading edges 55 as shown by arrow 56. Basically, the front of the slider is aimed in the flying direction, with the sharp part of the V-shaped acting to push away any accumulated debris.

Although it is not shown in either FIG. 5A or 5B, the leading edge portion of each rail 52 may be tapered to improve the lift-off characteristics of the slider. FIG. 5C illustrates a slider 50 having rails 52 which include tapered sections 57.

FIGS. 6A–6C illustrate other alternative embodiments of the present invention wherein the magnetic recording head flies above the surface of the disk. Each of the sliders of FIGS. 6A–6C is shown having a plurality of rail members, with each rail member providing an air-bearing surface that is approximately parallel to the surface of the disk. In each case, the leading edges of the rail members is shaped so as to reduce the problem of debris accumulation at the disk-slider interface in a manner consistent with the explanation above.

By way of example, FIG. 6A illustrates a slider 60 having a pair of rails 62 extending from the body of the slider toward the surface of the disk medium. Rails 62 are disposed at opposite sides of slider 60 and are parallel to one another. Each-of the rail members 62 has a leading edge 65 which is substantially narrower than the trailing edge 64. In the case of slider 60, the leading edge 65 has a "knife-edge" shape, wherein the front portion of the rail gradually tapers to a sharp point. Unlike slider 50 in FIGS. 5A–5C, most of the length or extent of rail members 62 is largely rectilinear in shape,—with only the front portion being modified to reduce the problem of debris accumulation.

Similarly, in FIG. 6B, slider 70 includes rail members 72 each having a leading edge 75 and trailing edge 74. In the case of slider 70, the leading edge portion of the rail members are again shaped to have a "knife-edge" profile, wherein the leading edge 75 is again narrower than the trailing edge 74. The only difference between the embodiment in FIG. 6A and that shown in FIG. 6B is that in FIG. 6B, the narrower leading edge is symmetrical about the center of the rail.

FIG. 6C shows a third variation of the basic concept of the present invention wherein slider 80 includes rail members 82 each having a leading edge 85 which is narrower than trailing edge 84. In the case of slider 80, leading edge 85 is "U-shaped" to deflect oncoming debris thereby preventing it from accumulating at the slider-disk interface. It is appreciated that the leading edge 85 of rail members 82 may also be parabolic, hyperbolic, or some other curved surface which can be represented by a mathematical function.

Practitioners in the art will further appreciate that the embodiments disclosed above do not require any major changes or complications in the basic process for manufacturing a slider. For example, in order to change a known head such as that shown in FIG. 2, to include the Invented designs of either FIG. 3 or 4 would only require a simple modification to one of the mask designs.

Whereas many modifications and alterations of the present invention will no doubt become apparent to one having ordinary skill in the art after having read the forgoing disclosure, it is to be understood that the particular embodiments shown and described by way of illustration are in no way intended to be limiting. Therefore, reference to the details of the illustrated diagrams is not intended to limit the scope of the claims which themselves recite only those features regarded as essential to the invention.

We claim:

1. A recording head for reading and writing information with respect to a rotating disk medium, said head including a pad having a working surface which contacts said medium during the reading/writing process, a magnetic pole tip structure being embedded within said pad, wherein said pad has a leading edge and a trailing edge with said leading edge facing in the general direction of relative motion between said head and said medium, said pad has a V-shape with the narrow part of said V-shape pointing in said direction, and said leading edge has a narrower width than said trailing edge.

\* \* \* \* \*